(12) United States Patent
Wallace

(10) Patent No.: US 11,979,010 B2
(45) Date of Patent: May 7, 2024

(54) OVERMOLDED WIRING HARNESS

(71) Applicant: AEES Inc., Farmington Hills, MI (US)

(72) Inventor: Ajene Wallace, Detroit, MI (US)

(73) Assignee: AEES Inc., Farmington Hills, MI (US)

(*) Notice: Subject to any disclaimer, the term of this patent is extended or adjusted under 35 U.S.C. 154(b) by 254 days.

(21) Appl. No.: 17/615,999

(22) PCT Filed: Jun. 5, 2020

(86) PCT No.: PCT/US2020/036371
§ 371 (c)(1),
(2) Date: Dec. 2, 2021

(87) PCT Pub. No.: WO2020/247784
PCT Pub. Date: Dec. 10, 2020

(65) Prior Publication Data
US 2022/0320840 A1 Oct. 6, 2022

Related U.S. Application Data

(60) Provisional application No. 62/857,468, filed on Jun. 5, 2019.

(51) Int. Cl.
*B29C 70/70* (2006.01)
*B60R 16/02* (2006.01)
(Continued)

(52) U.S. Cl.
CPC ........... *H02G 3/0468* (2013.01); *B29C 70/70* (2013.01); *B60R 16/0215* (2013.01); *B29L 2031/34* (2013.01)

(58) Field of Classification Search
CPC .. H02G 3/0468; B29C 70/70; B60R 16/0215; B29L 2031/34
(Continued)

(56) References Cited

U.S. PATENT DOCUMENTS 4,424,834 A * 1/1984 Sumi ................. F16L 11/11
428/483
4,986,575 A 1/1991 Braun
(Continued)

FOREIGN PATENT DOCUMENTS

CN 103069677 A 4/2013
CN 105556773 A 5/2016
(Continued)

OTHER PUBLICATIONS

Supplementary European Search Report for Application EP 20 81 9052 dated Mar. 30, 2023, 4 pages.
(Continued)

*Primary Examiner* — Timothy J Thompson
*Assistant Examiner* — Michael F McAllister
(74) *Attorney, Agent, or Firm* — Howard & Howard Attorneys PLLC

(57) ABSTRACT

A wiring harness for coupling electronic components includes a hollow trunk sleeve and a hollow branch sleeve. The trunk sleeve includes one or more notches and bends spaced apart along its length. The branch sleeve is interconnected to the trunk sleeve at each corresponding notch, with each branch sleeve open to the trunk sleeve through the respective notch. A bundle of wires extends through the trunk sleeve, with a sub-set of the bundle extending through each notch and corresponding branch sleeve. A first encapsulation layer is disposed about the trunk and branch sleeve at each interconnection separately secures each branch sleeve to the trunk sleeve. A second encapsulation layer is disposed about each bend to maintain the trunk sleeve in a desired pre-defined pattern with each first and second encapsulation layer being separated such that at least a portion of the trunk sleeve is free of the encapsulation layers.

20 Claims, 4 Drawing Sheets

(51) Int. Cl.
*H02G 3/04* (2006.01)
*B29L 31/34* (2006.01)

(58) Field of Classification Search
USPC ........................................................ 174/72 A
See application file for complete search history.

(56) References Cited

U.S. PATENT DOCUMENTS

| | | | |
|---|---|---|---|
| 5,126,507 A | 6/1992 | Kirma | |
| 5,132,073 A * | 7/1992 | Nielsen | B29C 53/30 |
| | | | 264/506 |
| 5,164,546 A | 11/1992 | Kumagai | |
| 6,079,451 A * | 6/2000 | Hegler | H02G 3/0468 |
| | | | 174/92 |
| 6,129,120 A * | 10/2000 | Margot | H02G 3/263 |
| | | | 138/158 |
| 6,603,074 B2 * | 8/2003 | Seo | H02G 3/0468 |
| | | | 174/136 |
| 6,842,173 B2 | 1/2005 | Sakakura et al. | |
| 6,914,190 B2 | 7/2005 | Dunand et al. | |
| 8,525,029 B2 | 9/2013 | Kato et al. | |
| 9,136,048 B2 | 9/2015 | Takahashi et al. | |
| 9,531,173 B2 | 12/2016 | Masuda et al. | |
| 9,812,230 B2 | 11/2017 | Tsukamoto et al. | |
| 10,147,514 B2 | 12/2018 | Sugino | |
| 10,286,857 B2 | 5/2019 | Inao et al. | |
| 2002/0179318 A1 * | 12/2002 | Seo | B60R 16/0215 |
| | | | 174/71 R |
| 2004/0106732 A1 * | 6/2004 | Tsuji | C08L 53/00 |
| | | | 525/94 |
| 2005/0106934 A1 | 5/2005 | Hatori | |
| 2007/0267212 A1 | 11/2007 | Nachbauer et al. | |
| 2009/0035503 A1 * | 2/2009 | Bertoux | B32B 25/08 |
| | | | 428/475.5 |
| 2015/0294768 A1 | 10/2015 | Sakaki et al. | |
| 2015/0329069 A1 | 11/2015 | Daugherty et al. | |
| 2016/0190782 A1 * | 6/2016 | Tsukamoto | H02G 3/0468 |
| | | | 174/72 A |

FOREIGN PATENT DOCUMENTS

| | | |
|---|---|---|
| JP | 2003-029052 A | 1/2003 |
| JP | 2003029052 A | 1/2003 |

OTHER PUBLICATIONS

Chinese Search Report for Application CN 2020800475076 dated May 18, 2023, 3 pages.
English language abstract for CN 103069677 A extracted from espacenet.com database on Jun. 27, 2023, 2 pages.
English language abstract for JP 2003-029052 A extracted from espacenet.com database on Jun. 27, 2023, 1 page.
International Search Report for Application No. PCT/US2020/036371 dated Sep. 14, 2020, 1 page.
Meridian Cable, "Wire Harnesses and Wire Assemblies", https://www.meridiancableassemblies.com/2015/12/how-are-wire-harnesses-and-wire-assemblies-designed-and-manufactured/, 2015, 4 pages.
QL-Custom, "Automotive Wire Harnesses for Truck, Car, Trailer Vehicle Webpage", https://www.ql-custom.com/automotive-wire-harness.html, 2021, 6 pages.
Chinese Search Report for Application CN 2020800475076 dated Jan. 30, 2024, 3 pages.
English language abstract for CN 105556773 A extracted from espacenet.com database on Feb. 22, 2024, 1 page.

* cited by examiner

US 11,979,010 B2

OVERMOLDED WIRING HARNESS

CROSS-REFERENCE TO RELATED APPLICATIONS

The subject application is the National Stage of International Patent Application PCT/US2020/036371, filed on Jun. 5, 2020, which claims priority to and all the benefits of U.S. Provisional App. Ser. No. 62/857,468, filed Jun. 5, 2019, the contents of which are incorporated herein by reference in their entirety.

TECHNICAL FIELD

The subject invention relates to an overmolded wiring harness for providing a pre-formed harness to facilitate installation within a vehicle and protecting a bundle of wires against the adverse effects of vibrations, abrasions, moisture, and/or debris corresponding with automotive electronic systems.

SUMMARY OF THE INVENTION

A wiring harness for an automotive electronics system used to electrically connect electrical components is provided. The wiring harness includes a hollow trunk sleeve including one or more notches along a length between a pair of opposing ends. The hollow trunk sleeve also includes one or more bends along the length between the pair of opposing ends positioned in a desired pre-defined pattern, with each of the one or more bends spaced from the one or more notches. The wiring harness also includes a hollow branch sleeve coupled to the hollow trunk sleeve at each corresponding notch of the one or more notches to interconnect the hollow branch sleeve to the hollow trunk sleeve, with each hollow branch sleeve open to the hollow trunk sleeve through the respective notch. The wiring harness also includes a bundle of wires extending through the hollow trunk sleeve, with a sub-set of the bundle of wires extending through each notch and each corresponding hollow branch sleeve.

The wiring harness also includes a first encapsulation layer disposed about a portion of the hollow trunk sleeve and a portion of each of the hollow branch sleeves at each interconnection to separately secure the hollow branch sleeve to each hollow trunk sleeve. Still further, the wiring harness also includes a second encapsulation layer disposed about each bend to maintain the hollow trunk sleeve in the desired pre-defined pattern with each second encapsulation layer being separate and spaced from the first encapsulation layer on the hollow trunk sleeve such that at least a portion of the hollow trunk sleeve is free of the encapsulation layers.

In further exemplary embodiments, one or more of the hollow branch sleeves includes one or more bends along its wiring harness. In these embodiments, the wiring harness further includes an auxiliary encapsulation layer disposed about each bend of the hollow branch sleeve to maintain the hollow branch sleeve in the additional desired pre-defined pattern.

In any of these embodiments, each respective encapsulation layer may have a modulus of elasticity that is less than the modulus of elasticity of a hollow trunk sleeve and/or less than any one of the respective hollow branch sleeves. In addition, in any of these embodiments, any two respective encapsulation layers can be made of the same or different materials, and have the same or different respective modulus of elasticity, while still having a modulus of elasticity that is less than the modulus of elasticity of the hollow trunk sleeve and/or the hollow branch.

DETAILED DESCRIPTION OF THE INVENTION

Figure 1:
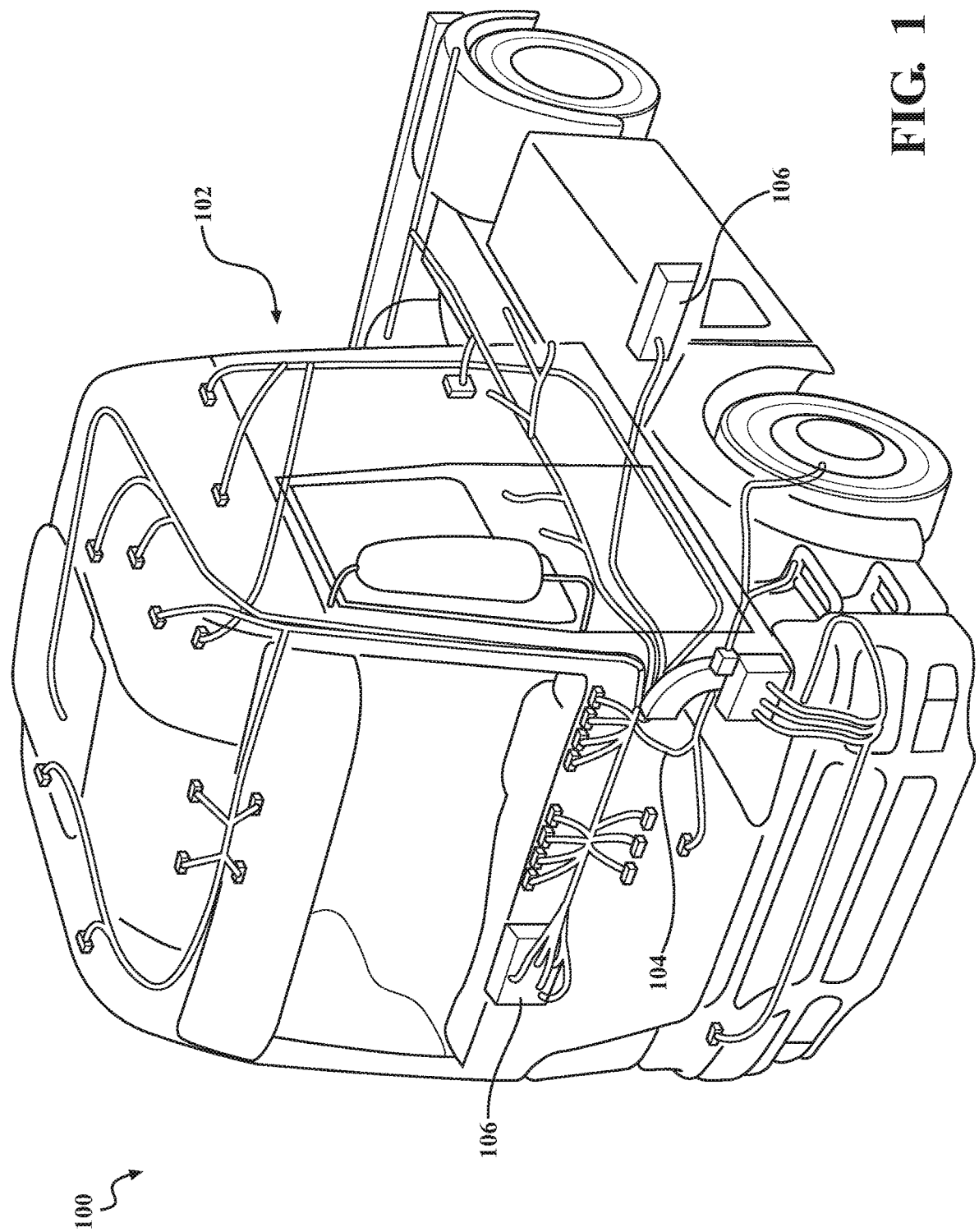
FIG. 1 is a perspective view of a vehicle having an automotive electronic system comprises a wiring harness in accordance with an exemplary embodiment and a plurality of electronic components coupled to the wiring harness.

The embodiments below are described with reference to the drawings. The relationship and functioning of the various elements of the embodiments are better understood by the following detailed description. However, the embodiments as described below are by way of example only, and the invention is not limited to the embodiments illustrated in the drawings. It should also be understood that the drawings are not drawn to scale and, in certain instances, details which are not necessary for an understanding of the embodiments have been omitted.

In the subject invention, a wiring harness includes one or more overmolded portions (i.e., encapsulated portions) for protecting a bundle of wires from the adverse effects of vibration, abrasion, moisture, and/or debris. The harness can be comprised of less material and produced by less expensive manufacturing processes, as compared to entire wiring harnesses that are produced by known Reaction Injection Molding ("RIM") processes. Furthermore, the wiring harness is pre-formed with its various overmolded portions to facilitate assembly of automotive electronic systems and installation of the wiring harness within a vehicle.

As provided herein, the term "overmolded" and the term "encapsulated", and any alternative forms thereof such as "encapsulation" or the like, may be used interchangeably and refer to the material that is applied onto the hollow trunk sleeve and hollow branch sleeves to maintain the wiring harness in a desired position, as further discussed below.

As generally shown in FIG. 1, a non-limiting example of a vehicle 100 having an automotive electronic system 102 comprises a wiring harness 104 and a plurality of electronic components 106 coupled to the wiring harness 104 for communicating with one another. Non-limiting examples of electronic components 106 can include power distribution centers (PDCs), fuse boxes, electronic control units, battery management systems, DC/DC converters, and timer and flasher relays. However, it is contemplated that the wiring harness can be used for coupling any suitable electronic components of automotive electronic systems.

Figure 2:
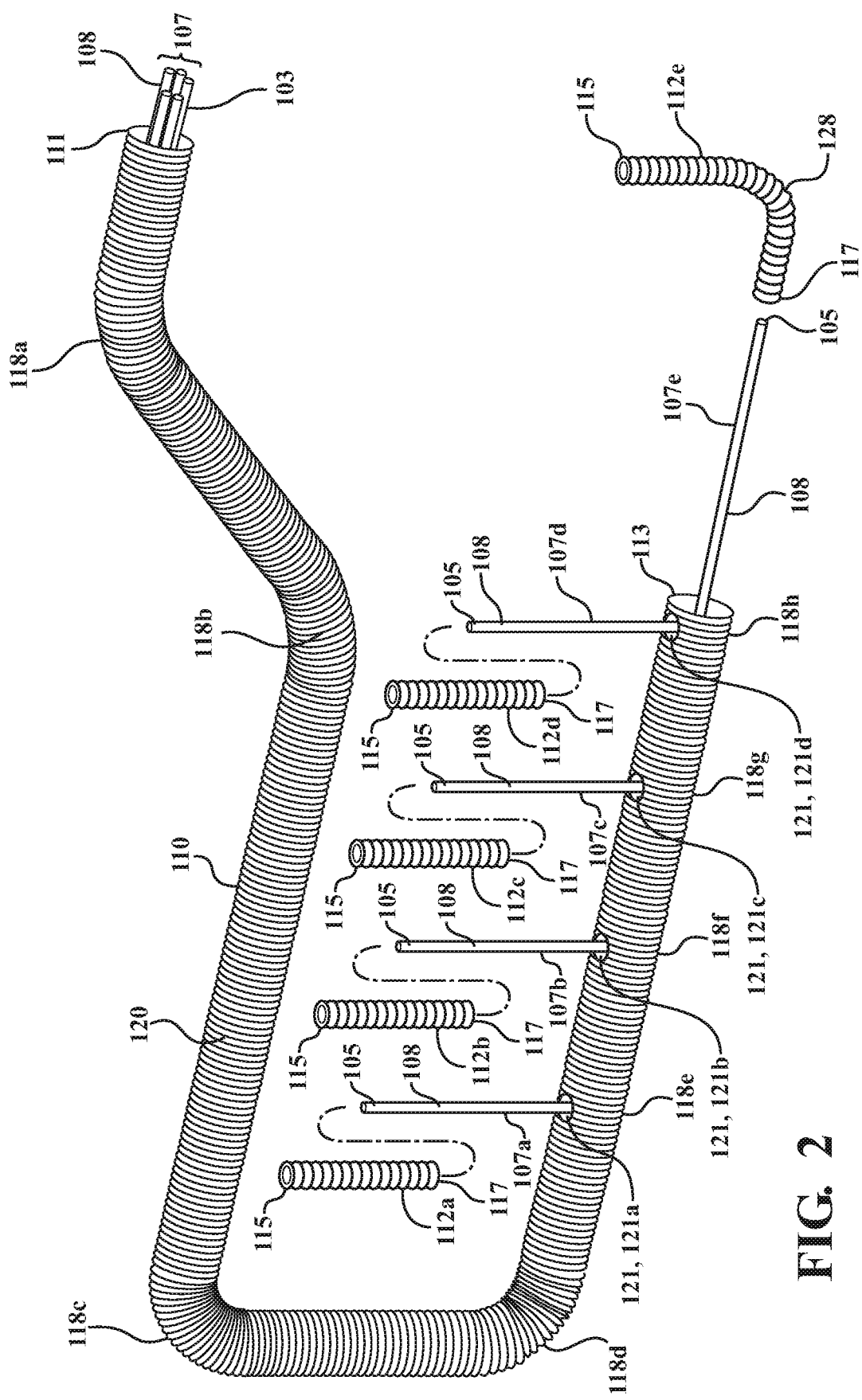
FIG. 2 is a perspective view of the hollow trunk sleeve, bundle of wires, and the one or more hollow branch sleeves for use in forming the wiring harness of FIG. 1 in a pre-assembled state.
Figure 3:
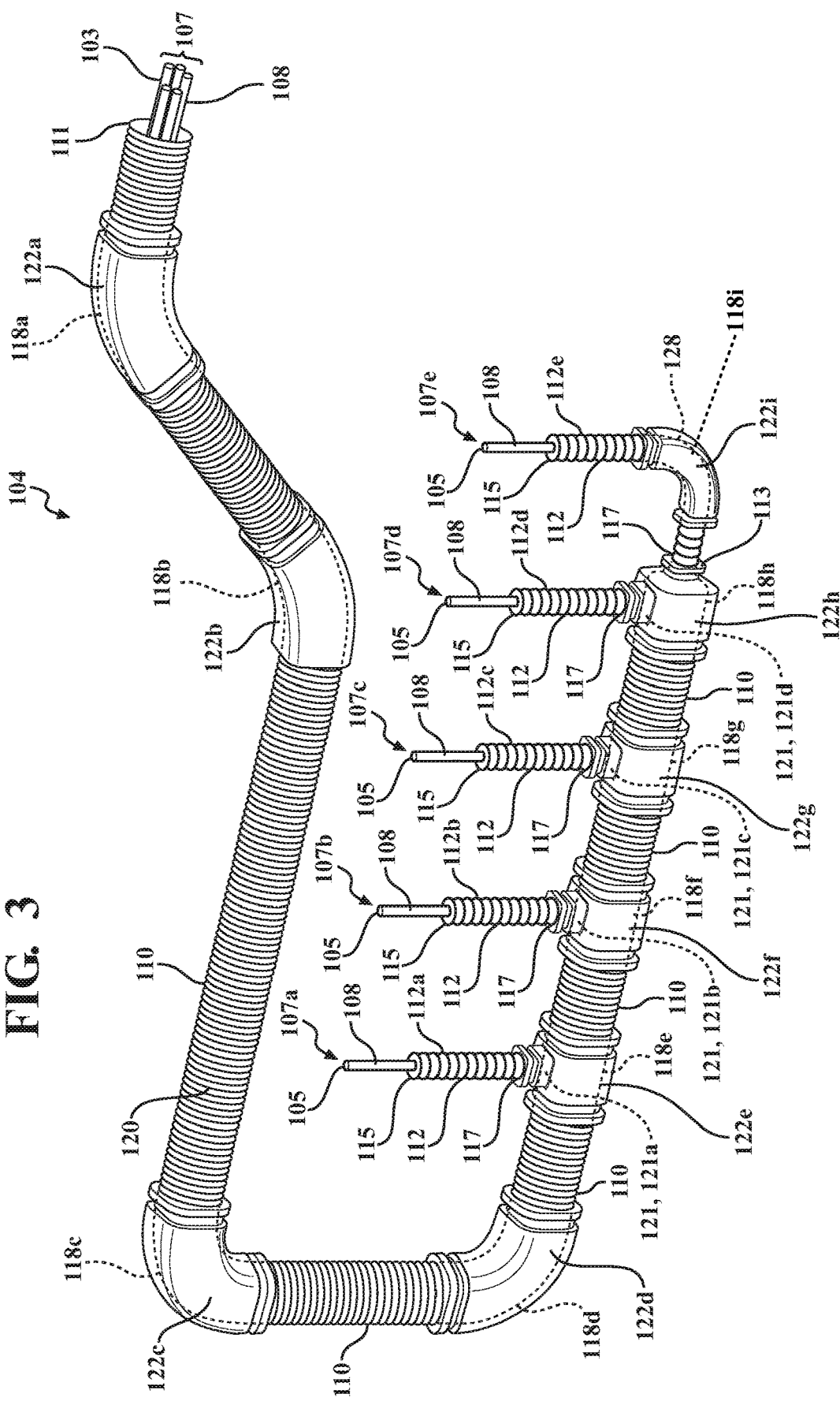
FIG. 3 is a perspective view of the wiring harness of FIG. 1 including the hollow trunk sleeve, bundle of wires and the one or more hollow branch sleeves of FIG. 2 in an assembled state and after encapsulation but prior to placement into a vehicle and prior to coupling to the one or more electronic components.

Referring to FIGS. 2 and 3, an enlarged view of one portion of the exemplary wiring harness 104 is illustrated.

The wiring harness 104 includes a hollow trunk sleeve 110 and one or more hollow branch sleeves 112 (shown as five hollow branch sleeves 112a-112e in FIGS. 2 and 3) for containing a bundle 107 of wires 108 (shown as five wires 108 in FIGS. 2 and 3) that electronically connect corresponding electronic components 106 to one another.

As best shown in FIG. 2, which illustrates a partial perspective view of the wiring harness 104 prior to assembly, the hollow trunk sleeve 110 and one or more hollow branch sleeves 112, sometimes alternatively referred to as convolutes in certain embodiments, are substantially tubular in shape (i.e., are a tubular hollow trunk sleeve 110 and one or more tubular hollow branch sleeves 112) and of the type that do not include a slit along their respective lengths, with each of the hollow trunk and branch sleeves 110, 112 including opposing open ends (with opposing open ends 111 and 113 corresponding to the hollow trunk sleeve 110, and with opposing open ends 115 and 117 corresponding to the one or more hollow branch sleeves 112.

As also illustrated in FIG. 2, each one of the hollow trunk and branch sleeves 110, 112 can be formed of a material having a modulus of elasticity that permits the respective hollow trunk sleeve 110 or any one or more of the hollow branch sleeves 112 to be bent or arranged in any suitable curved pattern, linear pattern, or combination thereof (collectively referred to as a desired pre-defined pattern), which corresponds with the available vehicle space receiving the wiring harness 104 such that the automotive electronics system can be installed within the vehicle 100. However, in other embodiments, portions of the length of the hollow trunk sleeve 110, or the length of any one or more of the hollow branch sleeves 112, may have varying thicknesses or compositions such that the modulus of elasticity varies for the desired end use. In certain embodiments, the material forming the hollow trunk sleeve 110 and/or any one or more hollow branch sleeves 112 also has electrical insulation properties. In the example of FIG. 2, the entire length of the hollow trunk sleeve 110 and each of the entire lengths of the hollow branch sleeves 112a-112e are formed from the same material and have a uniform modulus of elasticity.

In the example illustrated in FIGS. 2 and 3, the wiring harness 104 includes one hollow trunk sleeve 110 and five hollow branch sleeves 112 (also designated by reference numbers 112a-112e) prior to and separately coupled to the hollow trunk sleeve 110, although in other embodiments the number of hollow branch sleeves 112 may vary from one or more hollow branch sleeves.

As also illustrated in FIGS. 2 and 3, in one exemplary embodiment, the hollow trunk sleeve 110 is bent along its length between its opposing open ends 111, 113. In particular, the first and second portions 118a, 118b of the hollow trunk sleeve 110 can be bent or moved to positions providing two generally 45-degree bends. Furthermore, third and fourth portions 118c, 118d of the hollow trunk sleeve 110 can be bent or moved to positions providing two generally 90-degree bends. As also illustrated in FIGS. 2 and 3, one hollow branch sleeve 112e is also bent along its length between its opposing ends 115, 117. In particular, a portion 128 of the hollow branch sleeve 112e is bent or moved to an additional desired pre-defined pattern providing a generally 90-degree bend. While not illustrated, one or more of the other hollow branch sleeves 112a-d may also be provided with portions bent or moved to a position providing a 45-degree bend, or a 90-degree bend, or any other degree bend to form any one of the hollow branch sleeves in the additional desired pre-defined pattern.

The hollow trunk sleeve 110 can include one or more notches 121, shown as four separate spaced apart notches 121a, 121b, 121c, 121d in the exemplary embodiment of FIGS. 2 and 3, for communicating with an open end 117 of a corresponding one of the hollow branch sleeves 112a-d. In addition, one of the open ends (shown as open end 113 in FIG. 3) of the hollow trunk sleeve 110 can further define an additional notch for communicating with the open end 117 of hollow branch sleeve 112e. The notches 121a, 121b, 121c, 121d are preferably spaced from each portion 118a-d corresponding to the bends of the hollow trunk sleeve 110 along the length between the opposing open ends 111, 113. While the notches 121 are shown as circular openings in FIGS. 2 and 3, the shapes of such notches 121 as illustrated are schematic in nature and not limited to the circular openings provided.

As noted above, and as illustrated in FIG. 3, the wiring harness 104 also includes a bundle 107 of wires 108 that are coupled within the hollow trunk sleeve 110 with separate sub-sets 107a, 107b, 107c, 107d, 107e of the wires 108 also extending within each respective one of the plurality of hollow branch sleeves 112a-112e through each one of the respective notches 121a-121d or through the open end 113.

In particular, the bundle 107 of wires is inserted within the hollow trunk sleeve 110 at the first open end 111. Once inserted, one of the respective sub-sets 107a, 107b, 107c, 107d, 107e of the bundle 107 of wires 108, corresponding to the second end 105 of the wires 108, can be separated from the bundle 107 extending within the hollow trunk sleeve 110 and inserted into one respective one hollow branch sleeve 112a-e while extending through the corresponding respective one notch 121a, 121b, 121c, 121d, or through the open end 113 of the hollow trunk sleeve 110. As defined herein, each one respective one of the sub-sets 107a, 107b, 107c, 107d, 107e of the bundle 107 can include a single wire 108 or multiple wires (shown as a single wire 108 in each sub-set 107a, 107b, 107c, 107d, 107e in FIG. 3), and the number of wires 108 in any one respective sub-set 107a, 107b, 107c, 107d, 107e may be the same or different from any other one respective sub-set 107a, 107b, 107c, 107d, 107e of the bundles of wires 108 (i.e., the number of wires 108 in any one or more of the sub-sets 107a, 107b, 107c, 107d, 107e may be a single wire 108 as in FIG. 3 or could be two or more wires 108 in any one or more of the sub-sets 107a, 107b, 107c, 107d, 107e in alternative embodiments (not shown)).

Once fully inserted, each end 103, 105 of any individual one respective wire 108 of the sub-set 107a, 107b, 107c, 107d, 107e of the bundle 107 of wires 108, and any combination of wires 108 of the respective sub-sets 107a, 107b, 107c, 107d, 107e of the bundle 107 of wires 108, may be electronically coupled to a respective one or more corresponding electronic components 106 in the vehicle 100. In particular, the first end 103 of each of the wires 108 extends outwardly from the first open end 111 of the hollow trunk sleeve 110 and may be electronically coupled to a respective one or more corresponding electronic components 106 in the vehicle 100, whereas the second end 105 of the wires 108 extends outwardly from a respective open end of one of the one or more hollow branch sleeves 112a-e and may be electronically coupled to a respective one or more corresponding electronic components 106 in the vehicle 100.

Further, the length of each wire 108 of the bundle 107 of wires 108 between each respective open end 103, 105 may include a coating to electrically insulate (i.e., an electrical insulation coating (not shown)) each of the respective wires 108 from each of the other respective wires 108 in the bundle 107 or respective sub-set 107a-107e of the bundle 107. Stated another way, each of the wires 108 within the bundle 107 or the respective sub-set 107a-107e of the bundle 107 may be electrically insulated from each other wire 108. The ends 103, 105 of the wires 108 do not include the insulating coating so that they may be electrically coupled to the one or more corresponding electronic components 106 in the vehicle 100, as noted above.

Other examples of hollow trunk sleeve 110 can include any number of notches 121 at any point along the length of hollow trunk sleeve 110 for separating one or more wires 108 from the bundle 107 of wires 108. Moreover, portions 118e-118h of hollow trunk sleeve 110 can include respective Tee union connector (not shown) that separately couples hollow trunk sleeve 110 to each respective one of the one or more hollow branch sleeves 112. It is contemplated that the wiring harness 104 can have any number of hollow trunk sleeves 110 and/or hollow branch sleeves 112 that include portions arranged in any pattern suitable for installing the wiring harness 104 in a corresponding available space of the vehicle. Each one of the hollow trunk sleeve 110 and one or more hollow branch sleeves 112 can further comprise a plurality of corrugations 120 to facilitate bending to the desired pattern while maintaining an open passage for the bundle of wires 108 and preventing the hollow trunk sleeve 110 and/or one of the one or more hollow branch sleeves 112 from impinging on the wires 108, and thus may each alternatively be defined as corrugated tubes 110, 112 (or corrugated trunk tubes 110 and corrugated branch tubes 112). However, it is contemplated that one, or both, of the hollow trunk sleeve 110 and one or more hollow branch sleeves 112 may not have any corrugations 120. Further, the corrugations 120 can be formed on the exterior, interior, or both, of the hollow trunk sleeve 110 and/or the one or more hollow branch sleeves 112.

The wiring harness 104 further comprises one or more encapsulation layers 122 (i.e., overmolded layers or otherwise applied layers) coupled to corresponding portions of the hollow trunk sleeve 110 and/or the one or more hollow branch sleeves 112 in the desired pre-defined pattern for installing the wiring harness 104 within the available vehicle space and/or protecting portions of the wiring harness 104 from vibration, abrasion, moisture, and/or debris. As one example, the encapsulation layers 122 may protect portions of the hollow trunk sleeve 110 and/or the one or more hollow branch sleeves 112 that pass through sharp sheet metal holes of a vehicle door.

As illustrated in FIG. 3, one example of the wiring harness 104 includes nine separate encapsulation layers 122a-122i (i.e., overmolded layers 122a-122i), which are coupled to, and preferably surround, corresponding portions 118a-118i of the hollow trunk sleeve 110 and/or one or more of the hollow branch sleeves 112. In this embodiment, at least a portion of the hollow trunk sleeve 110 is free from the encapsulation layers 122a-122i, which reduces the weight and the cost of the wiring harness 104.

Each of the encapsulation layers 122a-122i can have a modulus of elasticity that is less than the modulus of elasticity of the hollow trunk sleeve 110 and/or one or more of the hollow branch sleeves 112. Moreover, at least one of the encapsulation layers 122a-122i is spaced apart from at least another one of the encapsulation layers 122a-122i such that the entire length of the hollow trunk sleeve 110 and/or one or more of the hollow branch sleeves 112 is not surrounded by a single encapsulation layer 122, which reduces the weight and the cost of the wiring harness 104 as noted above. More preferably, each one of the encapsulation layers 122a-122i are spaced apart from each other one of the encapsulation layers 122a-122i.

As provided herein and corresponding to FIG. 3, the one or more encapsulation layers 122 for coupling a respective hollow branch sleeve 112 to the hollow trunk sleeve 110 may alternatively be referred to as the first encapsulation layers 122 (and are illustrated in one exemplary embodiment in FIG. 3 as first encapsulation layers 122e-122h for coupling the hollow trunk sleeve 110 to a respective one or more of the hollow branch sleeves 12a-d in FIG. 3). Further, the one or more encapsulation layers 122 for coupling to a corresponding bent portion 118 (shown as 118a-d in FIGS. 2 and 3) in the hollow trunk sleeve 110 may alternatively be referred to as the second encapsulation layers 122 (and are illustrated as second encapsulation layers 122a-d for coupling to a corresponding bend 118a-d of the hollow trunk sleeve 110 in FIG. 3). Still further, the one or more auxiliary encapsulation layers 122 for coupling to a bend in a respective one of the one or more hollow branch sleeves 112 may alternatively be referred to as an auxiliary encapsulation layer 122 (and are illustrated by an auxiliary encapsulation layer 122i coupled to the bent portion 128 of the hollow branch sleeve 112e in FIG. 3). Further, and as best illustrated in FIG. 3, each of the respective encapsulation layers 122a-122i are overmolded/coupled/applied in a manner wherein they are separated from each other along the hollow trunk sleeve 110 and/or along the respective one or more hollow branch sleeves 112a-e.

As illustrated in FIG. 3, each of the first encapsulation layers 122e-h are disposed about, and preferably surround, a respective portion 118e-h of the hollow trunk sleeve 110 and also are disposed about, and preferably surround, a respective portion (i.e., a respective one end 117) of a respective hollow branch sleeve 112a-d. Further, in the case of encapsulation layer 122h, this encapsulation layer 122h is disposed about, and preferably surrounds, each one of the ends 117 of two hollow branch sleeves 112d and 112e. Still further, in other exemplary embodiments, the respective first encapsulation layer is sized such that it is larger than the corresponding notch 121a-d, or the end 113, of the hollow trunk sleeve 110 and therefore ensures that there are not open gaps for exposure of any wire corresponding to the interface between the hollow trunk sleeve 110, the respective hollow branch sleeve 112a-d, and the respective first encapsulation layer 122e-h that provides expose to the wires 108 extending through the respective notch 121a-d or open end 113.

As also illustrated in FIG. 3, the second encapsulation layer 122a-d is disposed about, and preferably surrounds, each respective portion 118a-d corresponding to the bend in the hollow trunk sleeve 110 to maintain the hollow trunk sleeve 110 in the desired pre-defined pattern. Still further, in certain embodiments, each of the second encapsulation layers 122a-d are separate and spaced from each first encapsulation layer 122e-h on the hollow trunk sleeve 110 such that at least a portion of the hollow trunk sleeve 110 is free of the encapsulation layers. Even still further, in certain embodiments, at least one, and more preferably each one, of the second encapsulation layers 112a-d is separate and spaced from each other one of the second encapsulation layers 112a-d.

Even still further, in certain embodiments, the auxiliary encapsulation layer 122i is disposed about, and preferably surrounds, the portion 128 of one of the hollow branch sleeves 112e to a maintain the hollow branch sleeve 112e in the additional desired pre-defined pattern. Still further, auxiliary encapsulation layer 122i is preferably separate and spaced from each other one of the first encapsulation layers 122e-h along the hollow trunk sleeve 110.

Preferably, the encapsulation layers 122a-122i are formed of known or standard polyurethane overmold material. However, it is contemplated that one or more of the encapsulation layers 122a-122i can be formed of nitrile butadiene rubber (NBR), polyvinyl chloride or any other suitable material. In certain embodiments, the one or more of the encapsulation layers 122a-122i may be formed from the same material, or different materials, from any other one of the one or more encapsulation layers 122a-122i, and in certain embodiments also have a modulus of elasticity that is less than the modulus of elasticity of the respective hollow trunk sleeve 110 and/or one or more of the hollow branch sleeves 112. Preferably, as noted above, the overmold material for forming the encapsulation layers 122a-122i is polyurethane, and it is applied through a reaction injection molding (RIM) process or other similar molding or forming process.

Figure 4:
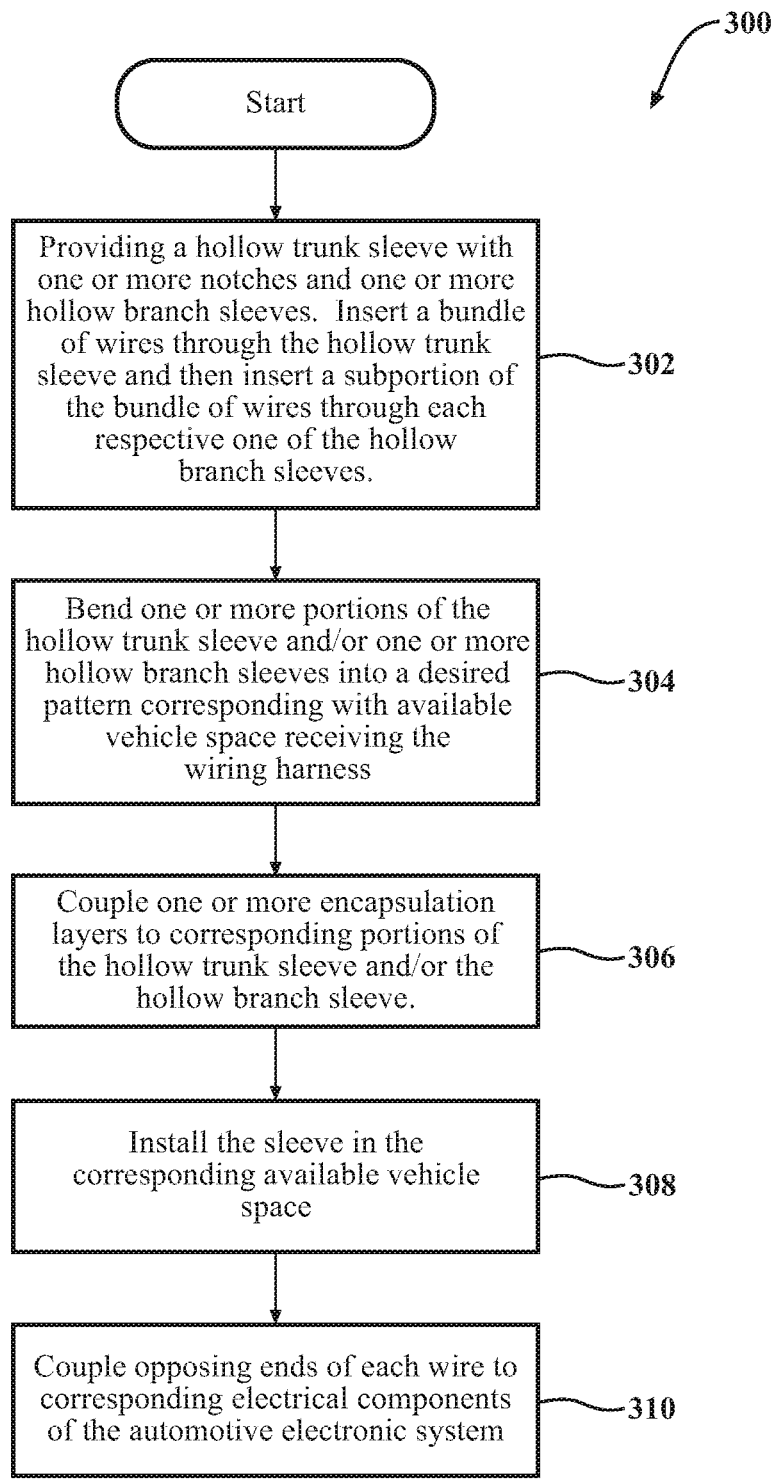
FIG. 4 is a logic flow diagram for forming the wiring harness having the coupled plurality of electronic components of FIG. 1.

Referring to FIG. 4, a flowchart for a method 300 of manufacturing the overmolded wiring harness 104 of FIG. 2 is illustrated.

At step 302, the hollow trunk sleeve 110 and the one or more hollow branch sleeves 112a-e are provided, with the hollow trunk sleeve 110 already including the notches 121a-d. Alternatively, as a preliminary step, the notches 121a-d may be introduced to the hollow trunk sleeve 110 by cutting an opening in the hollow trunk sleeve 110 or otherwise punching a hole into the hollow trunk sleeve 110 for each of the respective notches 121a-d.

Further, the bundle 107 of wires 108 is inserted and extends within the provided hollow trunk sleeve 110 and a respective sub-set 107a, 107b, 107c, 107d, 107e of these bundles 107 of wires 108 is separated from the bundle 107 of wires 108 in the hollow sleeve 110 and inserted through a respective one notch 121a, 121b, 121c, 121d in the hollow trunk sleeve 110, or through the open end 113 of the hollow trunk sleeve 110, and through a respective one of the provided hollow sleeves 112a-112e.

The insertion of the bundle 107 of wires 108 in step 302 is such that one end 103 of the wires 108 extends through one opposing end 111 of the hollow trunk sleeve 110 while the opposite end 105 of the wires 108 extends through the opposing open end 115 of a respective one of the hollow sleeves 112a-112e. More in particular, the ends of the respective sub-set 107a, 107b, 107c, 107d, 107e of these bundles 107 of wires 108 extends from a respective one of the open ends 115 of a respective one of the hollow branch sleeves 112a-e.

At step 304, one or more portions (such as portions 118a, 118b, 118c, 118d as shown in FIG. 3) of the hollow trunk sleeve 110 and/or any portions of one or more of the hollow branch sleeves 112 (such as the bent portion 128 of hollow branch sleeve 112e as shown in FIG. 3) may be bent or moved to positions that provide the desired pre-defined pattern corresponding with the available vehicle space within which the wiring harness 104 is installed in the vehicle 100. In certain embodiments, the bending of the hollow trunk sleeve 110 and/or the bending of one or more of the hollow branch sleeves 112 of step 304 can be performed prior to step 302.

At step 306, one or more encapsulation layers 122a-122i are coupled to corresponding portions 118a-118h of the hollow trunk sleeve 110 and/or the one or more of the hollow branch sleeves 112 for holding the harness 104 in the desired pattern and protecting the wires 108 from the adverse effects of vibration, abrasion, moisture, and/or debris within the vehicle. In this example, each encapsulation layers 122a-122i are respectively overmolded (or otherwise encapsulated or applied) onto of the hollow trunk sleeve 110 and/or any portions of one or more of the hollow branch sleeves 112 so as to protect the same and hold the wiring harness 104 in the desired pre-defined pattern for installation in the vehicle 100. Preferably, the overmolding is done via a reaction injection molding process.

As a part of step 306, each one of the hollow branch sleeves 112a-112d is positioned such that one opposing end 117 is positioned adjacent to a corresponding notch 121a, 121b, 121c, 121d, in the hollow sleeve 110 and the opposing open end 117 of the hollow branch sleeve 112e is positioned adjacent to the open end 115 of the hollow trunk sleeve 110 prior to overmolding or encapsulation. As noted above, a portion of the wires 108 of each respective portion 107a-d of the bundle 107, inward of its respective end 105, extends through the other opposing open end 117 of the hollow sleeves 112a-112e at this interface with the adjacent respective notch 121a, 121b, 121c, 121d or at the interface with the open end 115 of the hollow trunk sleeve 110.

In certain embodiments, step 306 is performed in a sequential manner, with one or more of the one or more encapsulation layers 122a-122i overmolded/coupled/applied in a first step and one or more of the other one or more encapsulation layers 122a-122i overmolded/coupled/applied in a second or subsequent step. Alternatively, in certain embodiments, step 306 is performed in a single step, with each of the encapsulation layers 122a-122i applied in a single step at the same time.

At step 308, the wiring harness 104 is installed within the available vehicle space of the vehicle 100. Examples of the available vehicle space can include a front dashboard or instrument cluster, a vehicle door, or any other portion of the vehicle 100.

At step 310, the opposing ends 103, 105 of each wire 108 may be coupled to corresponding one or more electrical components 106 of the automotive electronics system 102.

It is to be appreciated that the above embodiments of the wiring harness 104 may be used individually, as described above, or in combination with one another to simultaneously operate a pump and inflate or deflate the upper and lower air cells.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A wiring harness for coupling electronic components, said wiring harness comprising:
   a hollow trunk sleeve including one or more notches along a length between a pair of opposing ends, said hollow trunk sleeve also including one or more bends along said length between said pair of opposing ends to form a desired pre-defined pattern, with each of said one or more bends spaced from said one or more notches;
   a hollow branch sleeve coupled to said hollow trunk sleeve at each corresponding notch of said one or more notches to interconnect said hollow branch sleeve to said hollow trunk sleeve, with each hollow branch sleeve open to said hollow trunk sleeve through said respective notch;
a bundle of wires extending through said hollow trunk sleeve, with a sub-set of said bundle of wires extending through each notch and each corresponding hollow branch sleeve;
a first encapsulation layer disposed about a portion of said hollow trunk sleeve and a portion of each of said hollow branch sleeves at each interconnection to separately secure said hollow branch sleeve to each hollow trunk sleeve; and
a second encapsulation layer disposed about each bend to maintain said hollow trunk sleeve in said desired pre-defined pattern with each second encapsulation layer being separate and spaced from said first encapsulation layer on said hollow trunk sleeve such that at least a portion of said hollow trunk sleeve is free of said encapsulation layers.

2. The wiring harness of claim 1, wherein said first encapsulation layer and said second encapsulation layer each have a modulus of elasticity less than the modulus of elasticity of said hollow trunk sleeve and said hollow branch sleeve.

3. The wiring harness of claim 1, wherein said hollow branch sleeve includes one or more bends along a length between a pair of opposing ends in an additional desired pre-defined pattern, and wherein said wiring harness further comprises an auxiliary encapsulation layer disposed about each bend of said hollow branch sleeve to a maintain said hollow branch sleeve in said additional desired pre-defined pattern.

4. The wiring harness of claim 3, wherein said auxiliary encapsulation layer has a modulus of elasticity less than the modulus of elasticity of said hollow trunk sleeve and said hollow branch sleeve.

5. The wiring harness of claim 1, wherein a material for forming said first encapsulation layer is the same as a material for forming said second encapsulation layer.

6. The wiring harness of claim 1, wherein a material for forming said first encapsulation layer is different from a material for forming said second encapsulation layer.

7. The wiring harness of claim 3, wherein a material for forming said auxiliary encapsulation layer is the same as said material for forming said first and second encapsulation layer.

8. The wiring harness of claim 3, wherein a material for forming said auxiliary encapsulation layer is different from said material for forming one or both of said first and second encapsulation layer.

9. The wiring harness of claim 3, wherein a material for forming said auxiliary encapsulation layer is different from said material for forming one of said first and second encapsulation layer and is the same as said material for forming another one of said first and second encapsulation layer.

10. The wiring harness of claim 1, wherein said first encapsulation layer comprises a polyurethane encapsulation layer or a nitrile butadiene rubber (NBR) encapsulation layer.

11. The wiring harness of claim 1, wherein said second encapsulation layer comprises a polyurethane encapsulation layer or a nitrile butadiene rubber (NBR) encapsulation layer.

12. The wiring harness of claim 3, wherein said auxiliary encapsulation layer comprises a polyurethane encapsulation layer or a nitrile butadiene rubber (NBR) encapsulation layer.

13. The wiring harness of claim 3, wherein each separate first encapsulation layer is spaced from each other respective separate first encapsulation layer on said hollow trunk sleeve.

14. The wiring harness of claim 1, wherein said first encapsulation layer is larger than said notch at each interconnection of said hollow trunk sleeve and said hollow branch sleeve.

15. The wiring harness of claim 1, wherein said first encapsulation layer surrounds said portion of said hollow trunk sleeve and said portion of each of said hollow branch sleeves at each interconnection to separately secure said hollow branch sleeve to said hollow trunk sleeve.

16. The wiring harness of claim 1, wherein said hollow trunk sleeve and said hollow branch sleeve are further defined as corrugated tubes.

17. An automotive electronics system for a vehicle comprising:
a plurality of electronic components; and
a wiring harness according to claim 1 coupled to said plurality of electronic components.

18. A method for forming a wiring harness for use in electronics components, the wiring harness including a hollow trunk sleeve having one or more notches along a length between a pair of opposing ends, at least one hollow branch sleeve, and a bundle of wires, said method comprising the steps of:
inserting the bundle of wires into the hollow trunk sleeve;
inserting a sub-set of the bundle of wires through each notch;
positioning each hollow branch sleeve adjacent a corresponding notch to interconnect the hollow branch sleeve to the hollow trunk sleeve with each hollow branch sleeve open to the hollow trunk sleeve through the corresponding respective separate one notch;
inserting the sub-set of the bundle of wires exiting each notch through each corresponding hollow branch sleeve;
bending the hollow trunk sleeve along the length to form a desired pre-defined pattern;
applying a first encapsulation material to form a first encapsulation layer disposed about a portion of the hollow trunk sleeve and a portion of each hollow branch sleeve at each interconnection to separately secure each hollow branch sleeve to the hollow trunk sleeve;
applying a second encapsulation material to form a second encapsulation layer disposed about each bend to maintain the hollow trunk sleeve in the desired pre-defined pattern with the second encapsulation layer being separate and spaced from each first encapsulation layer on the hollow trunk sleeve such that at least a portion of the hollow trunk sleeve is free of an encapsulation material.

19. The method of claim 18, further comprises the steps of:
bending the hollow branch sleeve along a length between a pair of opposing ends in an additional desired pre-defined pattern; and
applying an auxiliary encapsulation material to form an auxiliary encapsulation layer disposed about each bend on the hollow branch sleeve to maintain the hollow branch sleeve in the additional desired pre-defined pattern with the auxiliary encapsulation layer being separate and spaced from each first encapsulation layer on the hollow trunk sleeve.

20. The method of claim 18, wherein each respective first encapsulation layer and each respective second encapsulation layer and each respective auxiliary encapsulation layer have a modulus of elasticity less than the modulus of elasticity of said hollow trunk sleeve and the hollow branch sleeve.

* * * * *